United States Patent [19]

Takenaka et al.

[11] Patent Number: 4,733,873
[45] Date of Patent: Mar. 29, 1988

[54] MECHANICAL SEAL

[75] Inventors: Akira Takenaka; Masanori Hatanaka; Kuniharu Suzuki; Junichi Ito; Yoshifumi Yamada; Hironori Yoshida, all of Aichi, Japan

[73] Assignees: Taiho Kogyo Co., Ltd.; Aisin Seiki Kabushiki Kaisha, both of Japan

[21] Appl. No.: 779,913

[22] Filed: Sep. 25, 1985

[30] Foreign Application Priority Data

Sep. 25, 1984 [JP] Japan .................. 59-199750

[51] Int. Cl.$^4$ .................................. F16J 15/34
[52] U.S. Cl. ........................ 277/96.1; 277/68; 277/81 R; 277/215
[58] Field of Search ............. 277/134, 133, 153, 152, 277/96.1, 173, 176, 177, 81 R, 67, 68, 215

[56] References Cited

U.S. PATENT DOCUMENTS

| | | | |
|---|---|---|---|
| 2,402,033 | 6/1946 | Flinn | 277/215 X |
| 2,428,031 | 9/1947 | Mayes | 277/215 |
| 3,109,658 | 11/1963 | Barrett et al. | 277/96 X |
| 3,695,789 | 10/1972 | Jansson | 277/96.1 X |
| 3,744,805 | 7/1973 | Heinrich | 277/96.1 |
| 3,871,669 | 3/1975 | Repella | 277/153 X |
| 3,973,781 | 8/1976 | Grovich | 277/96.1 X |
| 4,142,731 | 3/1979 | Filippov et al. | 277/96.1 |
| 4,407,512 | 10/1983 | Trytek | 277/96.1 |
| 4,416,458 | 11/1983 | Takenaka et al. | 277/215 X |
| 4,447,064 | 5/1984 | Ehrmann et al. | 277/134 |

FOREIGN PATENT DOCUMENTS

| | | | |
|---|---|---|---|
| 574210 | 3/1933 | Fed. Rep. of Germany | 277/96.1 |
| 117854 | 9/1979 | Japan | 277/96.1 |
| 27569 | 12/1902 | Switzerland | 277/134 |

OTHER PUBLICATIONS

NASA Tech Brief (Brief 68-10270), Jul. 1968.

Primary Examiner—Allan N. Shoap
Attorney, Agent, or Firm—Sughrue, Mion, Zinn, Macpeak, and Seas

[57] ABSTRACT

A mechanical seal, such as may advantageously be used for an automotive water pump or the like, in which the amount of frictional torque is significantly reduced. The seal includes a follower ring through which a rotary shaft rotatably passes and a seat ring rotated by the shaft. Recesses are formed in the abutting surface of at least one of the two rings, each recess being defined by a forward edge and a rear edge and opening only to the inner circumferential surface of the rings. The forward edge of each recess is inclined from the inner circumferential surface to the rear side in the direction of rotation of the follower ring relative to the seat ring, and the rear edge extends from the outer end of the forward edge along a radial line extending through substantially the center of the shaft.

6 Claims, 8 Drawing Figures

MECHANICAL SEAL

BACKGROUND OF THE INVENTION

The present invention relates to a mechanical seal capable of providing a good sealing function by the engagement of a seat ring in sliding contact with a follower ring.

In general, a mechanical seal for a water pump used in an automobile engine includes a follower ring secured to a housing in such a manner as to allow a rotary shaft to pass through the ring, and a seat ring rotatable with the rotary shaft and in sliding contact with the follower ring. With this arrangement, fluid is prevented from leaking from the outside of an assembly toward the radially inner side, i.e., toward the rotary shaft, by the sliding contact provided between the follower ring and the seat ring.

Conventional mechanical seals formed with fine grooves at sliding contact portions have been described in U.S. Pat. No. 4,099,729.

In another seal, as shown in FIG. 1, fine grooves 31 are formed on at least one of the contracting surfaces of the follower and seat rings with the grooves being closed at their radially outer ends and opened at their inner ends. The outer ends of the grooves 31 are inclined to the rear side with respect to the relative direction of rotation between the follower and the seat rings. Such a structure is shown in commonly assigned copending U.S. patent application Ser. No. 642,733.

A mechanical seal of this type provided with fine grooves 31 is advantageous in attaining a better sealing effect than the conventional mechanical seal. However, such mechanical seal when employed in a water pump for an automobile results in increased frictional torque, even though contact with area between the rings is reduced by the area of the fine grooves.

Various experiments were conducted to find the reasons for such increased frictional torque. It is found that the mechanical seal for the water pump uses water as a lubricant normally at a temperature of more than 80° C. Therefore, the sliding surfaces are subjected to a temperature higher than the water temperature so that a sharp corner 33, defined by each of radially inner end portions of the fine grooves 31 and an inner circumferential surface 32 at the opening end of the grooves 31, is susceptible to deformation due to heat. The thermally deformed acute angle portion 33 is solidified. Due to its contact with the opposing surface, the frictional torque is increased.

SUMMARY OF THE INVENTION

In accordance with the invention, the sharp corners defined by the fine grooves at the inner circumferential surfaces at the openings of the grooves are removed, thus preventing the sharp corners from solid contact with the opposing sliding surface, and thereby reducing the level of frictional torque.

Such reduction in frictional torque may be achieved in a mechanical seal which comprises a rotary shaft, a follower ring permitting the rotary shaft to pass therethrough, and a seat ring rotatable together with the rotary shaft and in sliding contact with the follower ring. Recesses are formed in the abutting contact surface of at least one of the two rings, each recess being defined by a forward edge and a rear edge and opening to only an inner circumferential surface of the rings. The forward edge is inclined from the inner circumferential surface to the rear side in the direction of relative rotation between the follower and seat rings, and the rear edges extend from the outer end of the forward edge to approximately forwardly bulged in the relative direction of rotation between the seat ring and the follower ring to an extent that it is not subjected to thermal deformation. Further, it is preferable that the rear of the forward edge and/or the rear edge and the inner circumferential surface be joined by a smooth curved surface.

DESCRIPTION OF THE PREFERRED EMBODIMENT

Figure 3:
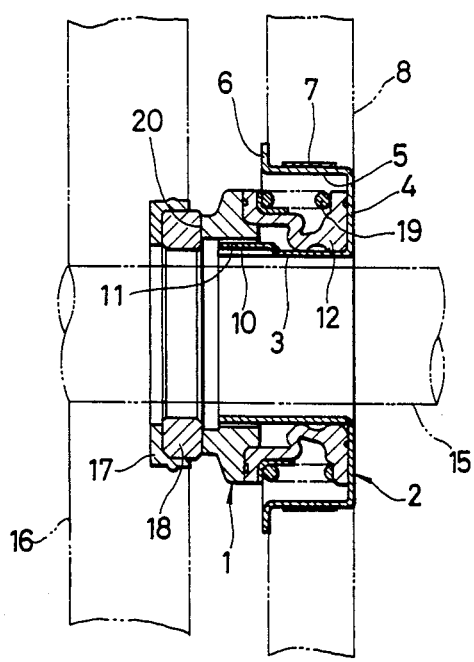
FIG. 3 is a sectional view of the seal of FIG. 4.
Figure 4:
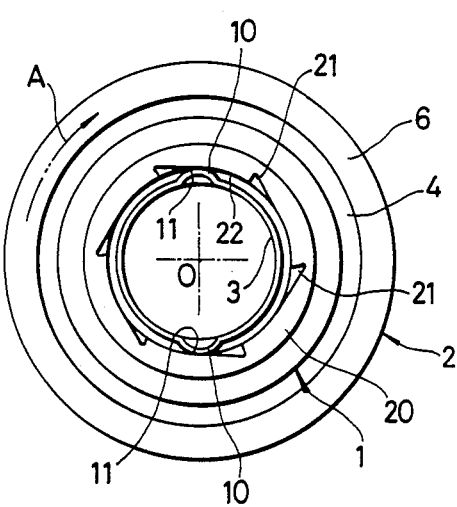
FIG. 4 is a front view of a main part of the seal of FIG. 3.

A preferred embodiment of the present invention will be explained with reference to the accompanying drawings. Referring to FIGS. 3 and 4, a case 2 having a follower ring 1 slidably mounted therein includes an inner sleeve 3 extending in the axial direction of a rotary shaft 15, a wall 4 radially outwardly extending from the inner sleeve 3, an outer sleeve 5 extending from the outer peripheral surface of the wall in a direction parallel to the axis of the inner sleeve 3, and a flange 6 extending radially outwardly from the outer sleeve 5. The outer sleeve 5 is circumferentially coated with rubber to form a sealing layer 7 thereon. A fluid-tight structure results upon fitting the sleeve 5 into the housing 8.

The follower ring 1, mounted over the inner sleeve 3 of the case 2, is axially slidable with respect thereto. The inner sleeve 3 is provided at its forward end with two radially outward projections 10 (FIGS. 3 and 4) equidistant from each other. The follower ring 1 is formed on its inner circumferential surface with corresponding grooves engageable with the two projections 10. This engagement allows the follower ring 1 to be axially slidably movable with respect to the case 2 but prevents the ring 1 from rotating with respect to the case 2. A sealing member 12 is disposed between the right side of the follower ring 1 (looking at FIG. 3), and the left side of the wall 4 of the case 2 to provide a fluid-tight seal therebetween.

An impeller 16 is mounted at the distal end of the rotary shaft 15 passing through the inner sleeve 3. A seat ring 18 is mounted through a seat packing 17 on the impeller 16. The follower ring 1 is urged toward the seat ring 18 by the biasing force of the spring 19. Sliding contact between the follower and seat rings prevents fluid from leaking from the outside to the inside of the sliding surfaces.

Figure 2:
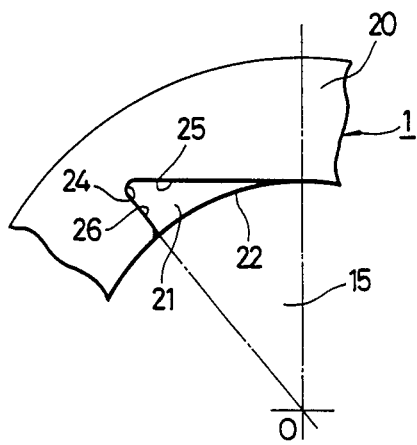
FIG. 2 is a front view of a portion of a preferred embodiment of a mechanical seal of the invention.

As shown in FIGS. 2 and 4, the sliding contact surface of one of the seat ring 18 and the follower ring 1 is provided with a plurality of recesses (six in this embodiment) equidistantly spaced from each other. Each of the recesses is closed at its outer end 24 and opened at its inner end to the inner circumferential surface of the sliding surface 20. In each of the recesses, the outer end 24 is positioned to the rear in the direction of relative rotation between the seat ring 18 and the follower ring 1.

More specifically, the seat ring 18 is rotated with the rotary shaft 15 in a direction reverse to the direction indicated by an arrow A in FIG. 4 so that the follower ring 1, supported by the case 2 on the housing 8, is rotated in the direction of the arrow A relative to the seat ring 18.

Each of the recesses 21, defined by a forward edge 25 and a rear edge 26, is opened to the inner circumferential surface 22 of the sliding surface 20. The forward edge 25 is inclined from the inner circumferental surface 22 rearwardly in the direction of relative rotation between the seat ring 18 and the follower ring 1. The rear edge 26 extends from the outer end 24 of the forward edge 25 to the approximate center O of the rotary shaft 15. The rear edge 26 may extend in either a straight line or a curved line to the approximate center O. So long as the rear edge 26 is out of solid contact with the seat ring 18 during thermal deformation of the edge 26, the rear edge may extend in the direction of the arrow A, but offset from a radial line directed to the center O. Alternatively, the rear edge may extend in a direction reverse to the direction of the arrow A if a pumping operation is to be performed by the recesses 21.

Junctions between the outer end 24 of the forward edge 25 and the rear edge 26 and between the rear edge 26 and the inner circumferential surface 22 are formed with smooth curves to avoid defects such as crack formation, damage, or cavitation erosion due to tubulent flow. The rear edge 26, which defines each of the recesses 21, can also be formed with a smooth curve in its depthwise direction to achieve the same purpose as in the case of the aforementioned curve. The same is true with respect to the forward edge 25 itself.

Figure 8:
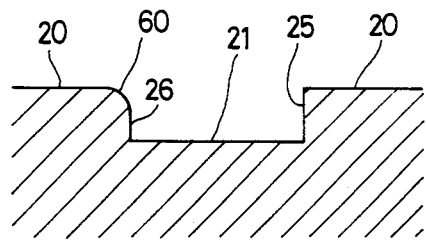
FIG. 8 is a cross-sectional view showing a recess portion of a seal of the invention.

Further, as shown in FIG. 8, it is preferable to form a portion 60, defined between the sliding surface and the wall of the recess 21 with a rounded edge. The rounded portion 60 should be provided at least at the rear edge side 26. The rounded portion 60 prevents strong abutment relative to the opposing sliding surface. Moreover, the generation of cavitation is suppressed by this rounded portion. For this purpose, the rounded portion 60 should not be provided primarily at a front side wall with respect to the direction of relative rotation between the seat and follower rings, but primarily at the rear side, i.e., the side of the rear edge 26, since cavitation is primarily generated at the rear side.

Figure 6:
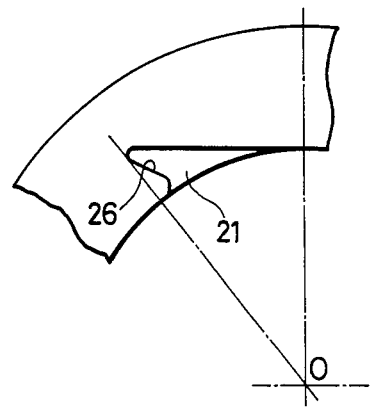
FIG. 6 is a front view similar to FIG. 2 but showing another embodiment of the invention.

Referring to another embodiment of the invention shown in FIG. 6, the rear edge 26 of each of the recesses 21 is curved and extends toward the approximate center O of the axis of the rotary shaft 15. The rear edge 26 is forwardly bulged in the direction of relative rotation of the follower ring 1 and the seat ring 18 to the extent that it is out of solid contact with the seat ring 18. The remaining portion is fabricated in the same manner as in the embodiment shown in FIG. 2, and hence it will not be explained again in detail.

Each of the recesses 21, indicated by an imaginary line in FIG. 6, is made triangular in shape by removing the sharp corner 33 on the sliding surface 30, the sharp corner being defined by the fine groove 31 and the inner circumferential surface of the follower ring 1 obtained by opening the groove to form an acute angle. The mechanical seal with the recesses 21 formed by removing the sharp corner 33 may exhibit a sealing effect somewhat less than that of the mechanical seal which includes the fine grooves 31 with the sharp corners 33, but it nevertheless provides a sufficient sealability in comparison with conventional mechanical seals having smooth and flat sliding surfaces. In this embodiment of the invention, the sharp corners 33, which increase the frictional torque due to contact with the surface of the seat ring when subjected to thermal deformation, are removed, thereby minimizing the friction torque.

Figure 7:
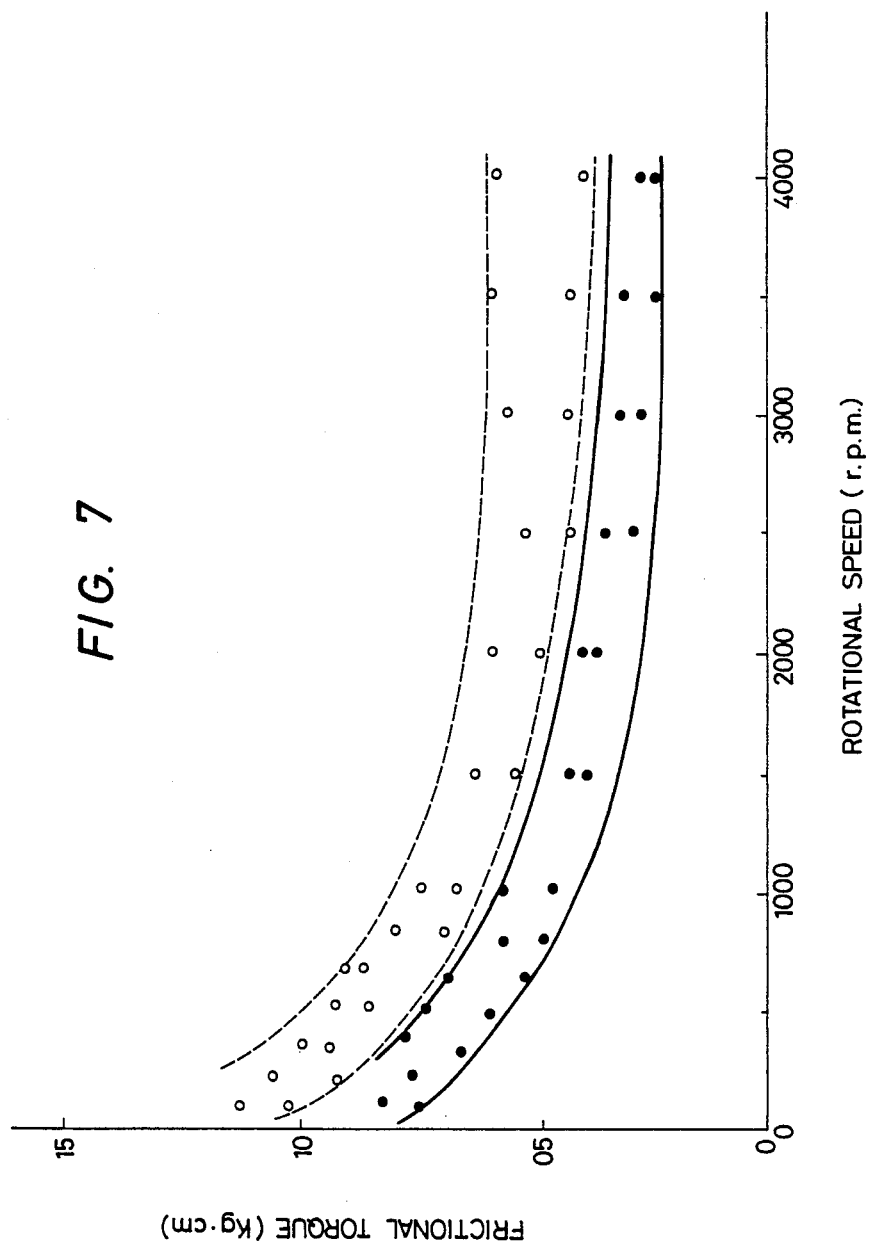
FIG. 7 is a graph showing test results of measurements of friction torque.

FIG. 7 is a graph showing test results of measurements of frictional torque made on a mechanical seal with the recesses 21 and without the sharp corners 33 and the fine grooves 31 under the following test conditions: (In the graph, solid dots and circles represent the present invention and the prior art, respectively.)

Figure 1:
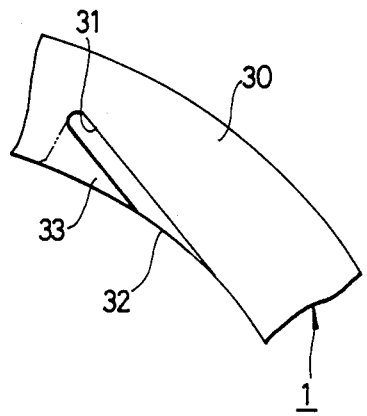
FIG. 1 is a front view of a prior art seal.

Testing machine: torque tester
Sealing liquid: pure water
Liquid temperature: 50° C.
Liquid pressure: 2 kg/cm$^2$ As seen from the test results, the mechanical seal according to the present invention, with the recesses 21 in which have been eliminated the sharp corners 33, is efficient in reducing the frictional torque in comparison with the prior art mechanical seal shown in FIG. 1. It is thus understood that the elimination of the sharp corners 33 lowers the amount of frictional torque since there is no sliding contact between the sharp edges and the opposing surface.

It is noted that the same function and effect can be obtained if the recesses 21 are formed on the sliding surface of the seat ring 18.

It will thus be seen that, according to the invention, a mechanical seal is provided which is more effective in reducing the level of frictional torque in comparison with the prior art mechanical seal in which fine grooves are formed. The above-mentioned recess structure is also applicable to mechanical seals having no member corresponding to the sealing member 12 shown in FIG. 3.

Figure 5:
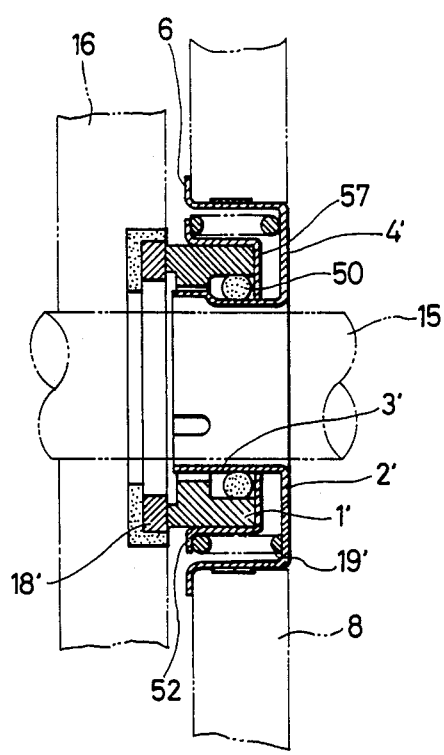
FIG. 5 is a cross-sectional view showing another mechanical seal of the invention.

More specifically, as shown in FIG. 5, wherein like parts and components are designated by the same reference numerals as in FIG. 3, an annular sealing ring 50 is disposed between an inner sleeve 3' and a follower ring 1'. Further, a retainer 57 is disposed over the follower ring 1'. A spring 19' is disposed between a wall portion 4' of a case 2' and the outer flanged portion 52 of the retainer to bias the follower ring toward a seat ring 18'. With this structure, the recess shown in FIGS. 2 or 6 can be formed in the sliding surface of either the follower ring 1' or the seat ring 18.

The generally triangular recesses 21 provided increased space, in comparison with the fine grooves, so that a strong sealing effect is provided in each of the recesses. This also leads to an increase of aeration, yet avoids cavitation erosion.

The present invention can be applied to pumps for automobile air conditioners and turbo-chargers, as well as for water pumps. In the former pumps, the seat ring and the follower ring may be reversed.

While the invention has been described in detail and with reference to specific embodiments thereof, it will be apparent to one skilled in the art that various changes and modifications can be made thereto without departing from the spirit and scope of the invention.

We claim:

1. A mechanical seal for preventing leakage of fluid, said seal comprising:
   (a) a rotary shaft;
   (b) a seat ring having an annular sliding contact surface; and
   (c) a follower ring having an annular sliding contact surface in sliding contact with said sliding contact surface of said seat ring, one of said seat ring and said follower ring being rotated by said rotary shaft, and the other ring allowing said rotary shaft to rotatably pass therethrough, wherein sliding contact between said sliding contact surfaces prevents said fluid from leaking from the outside to the inside of said sliding contact surfaces, so as to maintain fluid-tightness at an outer peripheral portion of an outer one of said follower ring and said seat ring, and wherein
   (d) at least one of said sliding contact surfaces has formed therein a plurality of recesses, each of which is defined by a forward edge and a rear edge, each of said recesses opening only to an inner circumferential surface of said one of said rings, said forward edge being inclined from said inner circumferential surface to an outer end extending radially outwardly and circumferentially from the intersection of said forward edge and said inner circumferential surface in a direction of relative motion between said seat ring and said follower ring, said intersection within each recess being defined by an acute angle, said rear edge extending radially inwardly from the radial and circumferential outer end of said forward edge along a radial line extending through substantially a center of said rotary shaft, said forward edge being longer than said rear edge and the rear edge and forward edge intersecting at an acute angle.

2. The mechanical seal defined in claim 1, wherein said seat ring is rotated by said rotary shaft, and said follower ring allows said rotary shaft to rotatably pass therethrough.

3. The mechanical seal defined in claim 1, wherein said outer end and rear edge are joined by a smooth curved surface.

4. The mechanical seal defined in claim 1, wherein said rear edge and inner circumferential surface are joined by a smooth curved surface.

5. The mechanical seal defined in claim 1, wherein at least a portion of said rear edge is rounded to suppress cavitation.

6. A mechanical seal for preventing leakage of fluid, said seal comprising:
   (a) a rotary shaft;
   (b) a seat ring having an annular sliding contact surface; and
   (c) a follower ring having an annular sliding contact surface in sliding contact with said sliding contact surface of said seat ring, one of said seat ring and said follower ring being rotated by said rotary shaft, and the other ring allowing said rotary shaft to rotatably pass therethrough, wherein sliding contact between said sliding contact surfaces prevents said fluid from leaking from the outside to the inside of said sliding contact surfaces, so as to maintain fluid-tightness at an outer peripheral portion of an outer one of said follower ring and said seat ring, and wherein
   (d) at least one of said sliding contact surfaces has formed therein a plurality of recesses, each of which is defined by a forward edge and a rear edge, each of said recesses opening only to an inner circumferential surface of said one of said rings, said forward edge being inclined from said inner circumferential surface to a rear side extending radially outwardly and circumferentially from the intersection of said forward edge and said inner circumferential surface in a direction of a relative motion between said seat ring and said follower ring, said intersection within each recess being defined by an acute angle, said rear edge extending radially inwardly from the radial and circumferential outer end of said forward edge at least partially along a radial line extending through substantially a center of said rotary shaft, said forward edge being longer than said rear edge and the rear edge and forward edge intersecting at an acute angle, said rear edge being forwardly bulged in the direction of relative motion between said seat ring and said follower ring to an extent that it is not subjected to thermal deformation.

* * * * *